United States Patent
Hölzle et al.

(10) Patent No.: US 6,926,880 B2
(45) Date of Patent: Aug. 9, 2005

(54) METHANOL REFORMING CATALYST HAVING A REDUCED VOLUME SHRINKAGE

(75) Inventors: Markus Hölzle, Kirchheim (DE); Michael Jolyon Sprague, Mannheim (DE); Klaus Harth, Altleiningen (DE); Martin Schüssler, Ulm/Donau (DE); Martin Karl, Neidlingen (DE); Stefan Boneberg, Beuren (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 52 days.

(21) Appl. No.: 10/090,762

(22) Filed: Mar. 6, 2002

(65) Prior Publication Data

US 2002/0193248 A1 Dec. 19, 2002

(30) Foreign Application Priority Data

Mar. 8, 2001 (DE) ......................... 101 11 198

(51) Int. Cl.$^7$ ............................... C01B 3/26
(52) U.S. Cl. ................... 423/648.1; 252/373; 423/656; 502/345; 502/346
(58) Field of Search ................ 252/373; 423/648.1, 423/655, 247, 437.2, 656; 502/342, 346, 345

(56) References Cited

U.S. PATENT DOCUMENTS 5,928,985 A * 7/1999 Williams ................ 502/345
6,051,163 A * 4/2000 Kumberger et al. ........ 252/373
2002/0169075 A1 * 11/2002 Holzle et al. ............... 502/342

FOREIGN PATENT DOCUMENTS

| DE | 195 05347 | 9/1995 |
| DE | 198 01373 | 7/1999 |
| EP | 884 270 | 12/1998 |
| EP | 884 272 | 12/1998 |

* cited by examiner

*Primary Examiner*—Stanley S. Silverman
*Assistant Examiner*—Maribel Medina
(74) *Attorney, Agent, or Firm*—Novak Druce & Quigg

(57) ABSTRACT

A methanol reforming catalyst containing passivated copper and zinc oxide and/or alumina can be prepared by (1) precipitating or spray-drying a mixture of catalyst precursor components dissolved or suspended in a diluent in order to form a solid catalyst precursor in the form of powder or granules, (2) calcining and reducing the solid catalyst precursor obtained in stage (1), (3) passivating the reduced catalyst precursor obtained in stage (2) and (4) shaping the passivated catalyst precursor obtained in stage (3) to form the catalyst.

A reduction in the volume shrinkage and an increase in the mechanical hardness during operation of the methanol reforming catalyst are achieved by the preparation process.

13 Claims, No Drawings

METHANOL REFORMING CATALYST HAVING A REDUCED VOLUME SHRINKAGE

The present invention relates to a methanol reforming catalyst, a process for its preparation, its use and a process for steam-reforming methanol.

In vehicles having a fuel cell drive, the hydrogen required is advantageously produced from a liquid fuel during the drive itself. In the case of methanol as a fuel, this is effected primarily by means of steam reforming, autothermal reforming or partial oxidation. With the use of hydrocarbons as fuel, it is possible to obtain hydrogen by partial oxidation or autothermal partial oxidation. The CO always concomitantly formed as a main product or byproduct must either be removed by a water gas shift or be oxidized by selective oxidation to give $CO_2$ which is not harmful to the fuel cell.

The steam reforming of methanol and the CO shift reaction are accelerated by Cu-containing catalysts. These are in general substances having the chemical composition CuO/ZnO/MeO where MeO is, for example, $Al_2O_3$, $ZrO_2$, $La_2O_3$ or $Cr_2O_3$. Such catalysts are prepared in oxide form and then generally activated in the reactor under reducing conditions, the CuO then being converted into elemental Cu, the actual catalytically active species. The reduction of such catalysts is always associated with a volume and mass shrinkage of the catalyst molding. This is typically of the order of magnitude of from 10 to 25%. In a completely filled reactor (e.g. a tube-bundle reactor or a plate-type heat exchanger reactor), this leads to up to a fourth of the reaction space remaining unused. This is undesirable particularly in the case of mobile reformers which are designed to be as compact as possible.

The use of catalysts for steam production in mobile applications, primarily in cars operated using fuel cells, imposes general conditions which go well beyond those necessary in industrial applications.

Thus, owing to the small amount of space available in the car, the size of the reactors, too, is very limited. The reaction space present in the reactor must be completely filled with catalyst so that no excess empty volume is present. The empty space formed may eliminate the fixing of the catalyst. If the catalyst is present, for example, as a bed, the catalyst pellets can then fly around during driving, owing to the high mechanical loads. This can lead to a substantial increase in the abrasion. This abrasion is undesirable since it can lead to blockages or other impairments of downstream components.

An additional problem may arise when the reformers are directly heated. Here, a heat transfer liquid is dispensed with and instead the heat required for the reforming is generated directly by catalytic combustion of hydrogen or methanol. In this method of heat generation, overheating can rapidly occur if parts of the reactor tubes or plates are not in contact with catalyst. Such overheating leads on the one hand to material fatigue in the reactor but on the other hand can also lead to coking of the fuel used.

The problem of volume shrinkage has long been known and proposed solutions to it have also been described. For example, EP-A-0 884 272 relates to the preaging of a Cu-containing catalyst by methanol reforming for about 50 hours. The preaging can be effected in a separate reactor or in the actual reformer reactor, it being necessary to replenish the catalyst several times in the last-mentioned case.

EP-A-0 884 270 relates to another pretreatment process for the same catalyst system. Here, the catalyst is preaged under an inert or oxidizing atmosphere at >300° C. However, the volume shrinkage in this type of pretreatment is not comparable with the volume shrinkage when the catalyst is treated with hydrogen. The heating of a catalyst under oxidizing/inert atmospheres leads merely to decomposition of hydroxide or carbonate species still present from the original precipitated product and, at higher temperatures, to burning-out of the tableting aid, such as graphite or magnesium stearate. Such a treatment does not lead to reduction of the copper oxide component in the catalyst to elemental copper, but it is precisely the reduction of the copper oxide to copper that is primarily responsible for the volume shrinkage of the catalysts since, in the reduction, the copper component, which is homogeneously distributed in the carrier matrix on precipitation, is dissolved out of this and hence numerous microscopic cavities remain. This is all the more pronounced when it is considered that a typical catalyst precursor has a density of about 1 g/ml whereas metallic copper, as present after the reduction, has a density of 9 g/ml. Although a catalyst heated under oxidizing/inert conditions suffers a decrease in volume, the volume shrinkage on subsequent activation under reducing conditions will be greater than the volume shrinkage during heating without a reducing agent.

According to DE-A-198 01 373, the catalyst is reduced and then deactivated again before introduction into the reactor.

Another constantly occurring adverse side effect in the reduction of catalysts is the substantial reduction in the mechanical stability. Particularly in the case of catalysts in tablet form, the hardness when removed (lateral compressive strength/end face compressive strength) is often only a fraction of the initial hardness measured when the catalyst was still in oxide form. The low mechanical stability of the tablets is however undesirable in the case of mobile reformers. If, for example, a compacted bed of catalyst tablets is present, there is always a certain friction of the tablets against one another during driving, which can lead to increased abrasion particularly at the corners and edges of the tablets. This abrasion is substantially independent of whether a cavity forms above the bed as a result of the volume shrinkage.

For obtaining a catalyst tablet which is mechanically stable in the reduced state too, there are various approaches which, on the one hand, aim at improving the active material and, on the other hand, also describe tableting additives for increasing the mechanical stability. For example, DE-A-195 05 347 describes a process in which a Cu-containing catalyst is tabletted by adding copper powder or aluminum powder. This leads to a substantial increase in the hardness of the catalyst in the reduced state too. However, a disadvantage of this process is that the activity of such catalysts is always lower than the activity of comparable catalysts without added metal.

It is an object of the present invention to provide a methanol reforming catalyst and a process for its preparation, the catalyst being distinguished by low volume shrinkage and high mechanical hardness. It is intended in particular to prepare copper-containing catalysts.

We have found that this object is achieved, according to the invention, by a methanol reforming catalyst containing passivated copper and zinc oxide and/or alumina, which can be prepared by (1) precipitating or spray-drying a mixture of catalyst precursor components dissolved or suspended in a diluent in order to form a solid catalyst precursor in the form of powder or granules, (2) calcining and reducing the solid catalyst precursor obtained in stage (1), (3) passivating the reduced catalyst precursor obtained in stage (2) and (4) shaping the passivated catalyst precursor obtained in stage (3) to form the catalyst.

We have found that this object is furthermore achieved by a process for the preparation of such a catalyst, said stages being carried out.

The expression passivated copper means at least surface oxidation of the copper cluster in the catalyst to form at least a surface copper oxide layer. Passivated copper is stable and non-pyrophoric in the air. The term passivated copper can also include completely oxidized copper and hence copper oxide. However, this expression is preferably understood as meaning that the copper cluster or copper crystallites are oxidized on the surface so that they are not pyrophoric in air.

The novel methanol reforming catalyst preferably contains passivated copper and zinc oxide and/or alumina as main components. It may substantially comprise these components, only small amounts of other ingredients being present. The catalyst may also consist of passivated copper and zinc oxide and/or zirconium oxide.

A catalyst prepared in this manner is preferably used, according to the invention, for steam-reforming methanol, but can also be used for steam-reforming higher alcohols, such as $C_{2-20}$-alkanols and hydrocarbons, for steam-reforming these hydrocarbons with addition of air or as a CO shift catalyst.

In a process for steam-reforming methanol by reacting methanol and water over such a catalyst, a pressure of from 0.5 to 10 bar and a temperature from 150 to 450° C. are preferably employed.

A large number of methanol reforming catalysts can be prepared by the novel process. Such catalyst compositions are described, for example, in DE-A-197 39 773 and EP-A-0 296 734.

Catalysts which contain (passivated) copper, zinc oxide and alumina are particularly preferred. Some or all of the zinc oxide may be replaced by other divalent metal ions, such as $Mg^{2+}$, $Ni^{2+}$ or $Mn^{2+}$. Some or all of the alumina may be replaced by other trivalent or tetravalent metal oxides, for example by zirconium, chromium, lanthanum, etc. In general, salts or oxides of one or more elements of the platinum metals, of groups 4, 5 and 11 and of the lanthanides of the Periodic Table of the Elements can additionally be introduced in the preparation.

The present invention relates in particular to copper-containing catalysts as used in fuel cell vehicles for methanol reforming and for the CO shift reaction. Such catalysts are distinguished by very good activity, which simultaneously permits small amounts of catalysts. This is a necessary condition for use in cars. Such catalysts are typically reduced with hydrogen in the reactor before the beginning of the reaction. Copper oxide is reacted with hydrogen to give copper and water. The metallic copper is present in the form of very small clusters which, for example, have a diameter of a few nm. They form the actual catalytically active species. For the reduction of copper-containing catalysts, such as methanol catalysts, synthesis catalysts or TTK catalysts, there are precise and detailed specifications, cf. for example Catalyst Handbook, Second Edition, Wolfe Publishing Ltd. 1989.

The novel catalysts have a combination of low volume shrinkage and high mechanical strength.

Both are achieved by reducing a catalyst precursor with hydrogen during the preparation itself and then passivating it again with oxygen. The dried and calcined precipitated powder, which is generally present in the form of spray-dried powder in industrial production, is advantageously used for this purpose. The powder pretreated in this manner can then be further processed to give moldings, possible steps including the following:

Precompaction and tableting of the powder pretreated according to the invention to give tablets.

Preparation of a slurry, kneading/mixing in a pan mill and extrusion to give extrudates.

Preparation of a slurry, kneading/mixing in a pan mill and extrusion to give complex moldings, e.g. monolithic structures or catalyst sheets with or without a secondary structure.

Application of the catalytically active material to inert or likewise catalytically active supports by means of Hicoating or similar methods.

In all processes, the use of binders and additives is of course also permitted. There are also numerous other possibilities for further processing.

The procedure described permits the production of moldings having low volume shrinkage during operation as a catalyst and high mechanical stability during operation in the reduced state.

The reduction of a catalyst precursor with hydrogen has also been used to increase the activity of the catalyst. EP-A-0 296 734 discloses this process for increasing the copper surface area in Cu-containing catalysts. As a result, the activity of the catalyst also increases, as described for the water gas shift reaction in the abovementioned patent. According to EP-A-0 296 734, however, the reduction is carried out using an intermediate which was not calcined beforehand. Furthermore, the temperature during the reduction with hydrogen may not exceed 200° C. Catalysts prepared by this method are however mechanically not very stable since they primarily still comprise metal carbonate and basic carbonate phases. Catalysts pretreated in this manner are very suitable for steady-state applications but not very suitable for mobile use.

According to the invention, the catalyst is first calcined at preferably >300° C. and then reduced or calcined at preferably <300° C. under reducing conditions. After the reduction, the catalyst is passivated by oxygen or air at least until further handling of the catalyst under air is possible. The unpassivated catalyst would be pyrophoric. A suitable reducing agent is primarily hydrogen, but it is also possible alternatively to use any desired other reductions.

Inter alia, the following process variants are possible for the reduction of the catalyst with hydrogen:

isothermal procedure with constant hydrogen concentration isothermal procedure with continuously increasing hydrogen concentration continuous increase in the temperature from room temperature (minimum) to 500° C. (maximum) with constant hydrogen concentration continuous increase in the temperature from room temperature (minimum) to 500° C. (maximum) with likewise continuously increasing hydrogen concentration.

The reduction is preferably carried out, at least initially, using dilute hydrogen, an inert gas, such as nitrogen or helium, being possible for dilution. Typical hydrogen concentrations are from 1 to 5%; however, it is also possible to employ pure hydrogen toward the end of the reduction. Throughout the process, it should be ensured that the exothermic nature of the reaction remains controllable.

Furthermore, the agglomeration of the resulting copper crystallites as a result of sintering is accelerated if the reduction is too rapid, leading to a considerable decline in the catalyst activity.

The subsequent passivation is preferably likewise carried out, at least initially, using dilute oxygen (dilute air or another oxidizing agent). Process sequences analogous or similar to those in the reduction are possible.

If passivation is effected using exclusively dilute air at room temperature (e.g. 1% of air in nitrogen), the clusters are only externally passivated, i.e. a covering of copper oxide forms. Elemental copper is still present in the interior of the clusters. Such a state is very much more likely to apply to the novel pretreatment than stronger passivation at higher oxygen concentrations or temperatures since, under these conditions, all the copper reduced beforehand is reoxidized. Accordingly, only external (surface) passivation is preferably effected.

A possible technical solution is, for example, the coupling of two rotating tubes, separation of the atmospheres being ensured by means of an inert lock. Hydrogen or oxygen (air) can be passed countercurrently to the catalyst powder in the respective rotating tube, with the result that an advantageous concentration gradient is achieved.

The shaping in stage (4) preferably leads to layers, extrudates, monoliths, strands, pellets or tablets.

In stage (2), the calcination and reduction can be carried out simultaneously (calcination in reducing atmosphere) or in succession, it being possible for the calcined catalyst precursor to be comminuted in between.

In addition to copper and zinc oxide, the catalyst may additionally contain alumina and further oxides. Solutions of zinc, aluminum and copper salts may be precipitated simultaneously or in any desired sequence in stage (1).

Stages (1) and (2) are particularly preferably carried out as follows:

(a) precipitation of a solution of zinc and aluminum salts, the Zn:Al atomic ratio being from 3:1 to 1:3, with an alkali metal carbonate or hydroxide solution at a pH of from 5 to 12 and a temperature of from 20 to 100° C., (b) isolation and washing of the precipitate to remove alkali metal ions, (c) drying of the precipitate, (d) calcination of the precipitate at from 250 to 800° C. to give a mixed oxide, (e) dispersing of the mixed oxide in an acidic solution of copper and zinc salts, the Cu:Zn atomic ratio in the solution being from 1:5 to 20:1, (f) precipitation of the dispersion with an alkali metal carbonate or hydroxide solution at a pH of from 6 to 9 and a temperature of from 20 to 100° C., (g) performance of steps (b) to (d), (h) reduction of the catalyst precursor obtained in stage (g) with a gas containing free hydrogen.

Particularly preferred catalysts have a Cu:Zn atomic ratio of from 1:5 to 5:1, particularly preferably from 1:1 to 4:1, in particular from 2:1 to 3:1. The (Cu+Zn):Al atomic ratio is preferably from 99:1 to 70:30, particularly preferably from 95:5 to 80:20. A Cu:Zn:Al ratio of about 65:25:10 is especially preferred.

This corresponds to a composition of about 67% by weight of Cu, 26.4% by weight of ZnO and 6.6% by weight of $Al_2O_3$ in the prepared catalyst.

In addition to the three elements Cu, Zn and Al, further elements may also be introduced into the catalyst, such as platinum metals and elements of groups 4, 5 and 11 and of the lanthanides of the Periodic Table of the Elements. Preferred examples are Pd, Pt, Rh, Ln, Os, Au, Zr, Ti, V, Nb, Ta and the lanthanides.

Preferred novel catalyst compositions are described in DE-A-197 39 773.

In stage (1), the drying is preferably carried out at from 20 to 400° C., particularly preferably from 50 to 200° C., in particular from 80 to 130° C. The calcination in stage (2) is preferably effected at from 200 to 800° C., particularly preferably from 250 to 600° C., in particular from 300 to 500° C.

The novel catalysts have a very low volume shrinkage in combination with only a slight loss of lateral compressive strength during operation in the reactor, in particular as a motor vehicle catalyst. The novel process steps are carried out during the catalyst preparation itself. There are no additional, expensive forming steps.

If the passivation of the catalyst is carried out under mild conditions, i.e. low temperatures (<50° C.) and low hydrogen partial pressures are employed, it is possible for the copper cluster present after the reduction to be only surface-passivated with a layer of $Cu_2O$. The core of the cluster furthermore consists of metallic copper. A catalyst prepared in this manner can be handled under air and, after filling of a mobile reformer, can be very easily reactivated there with only moderate evolution of hydrogen since a major part of the copper is still present in metallic form. If, on the other hand, an unpretreated catalyst is introduced into such a reformer, the catalyst must be completely activated in the reformer, which is associated with a strong exothermic reaction and very long times for the procedure. A catalyst pretreated according to the invention can accordingly substantially simplify the startup in the car by suitable reduction/passivation.

The present invention also relates to a process for reducing the volume shrinkage and for increasing the mechanical hardness during operation of methanol reforming catalysts, in which the methanol reforming catalyst is prepared by the process described above.

An example which follows illustrates the invention. In addition, corresponding counter-examples are intended to show that, when other methods are used, greater complexity is required in order to achieve the same target parameters with regard to volume shrinkage and hardness. When such methods are used, catalysts which have either hardness or low volume shrinkage are generally obtained. However, the two together are not possible according to the prior art.

EXAMPLE 1

A copper catalyst based on copper carbonate is prepared analogously to EP-A-0 296 734 (Example 1). The composition in atom % is: Cu=65%, Zn=25%, Al=10%. The precipitated product of the second precipitation stage is washed sodium-free and is dried at 120° C. Thereafter, the product is calcined at 300° C. for 4 hours and is comminuted to give from 0.5 to 0.7 mm chips.

4060 g of these chips are installed in a heatable tubular furnace (diameter: 100 mm, height: 1000 mm). The furnace is heated at 200° C. and a mixture of 1% of $H_2$ and 99% of $N_2$ (total: 100 l(S.T.P.)/h) is passed through the chips for 16 hours.

The hydrogen is then shut off and the furnace is cooled to room temperature. For passivation, the nitrogen is gradually enriched with air so that the temperature in the catalyst never exceeds 50° C. The end part of the passivation is reached when all nitrogen has been exchanged for air. The removed catalyst has a 14.2% lower mass and a 14% lower volume than the installed catalyst.

The chips are then precompacted and tableted on a tablet press to give small 1.5×1.5 mm tablets. The tableting is carried out in such a way that the lateral compressive strength of the tablets is about 40 N. The BET surface area of the tablets is 51 m²/g.

COMPARATIVE EXAMPLE 1

A copper catalyst based on copper carbonate is prepared analogously to EP-A-0 296 734 (Example 1). The composition in atom % is: Cu=65%, Zn=25%, Al=10%. The precipitated product of the second precipitation stage is washed sodium-free and is dried at 120° C. Thereafter, the product is calcined at 300° C. for 4 hours and is comminuted to give from 0.5 to 0.7 mm chips. The chips are converted directly into 1.5 mm tablets, a lateral compressive strength of about 50 N being established. The BET surface area of these tablets is 65 m²/g.

Catalyst Test:

The catalysts are introduced into a tubular reactor (diameter 10 mm; amount introduced=10 ml) and a 1.5 m/m mixture of methanol and water is passed over said catalysts at 280° C. and 2 bar. The catalysts are operated under these conditions for from 30 to 40 hours. Both catalysts have a comparable methanol conversion and hence also a comparable hydrogen evolution. The volume shrinkage and lateral compressive strength of the catalysts removed are measured. The results are summarized in Table 1:

TABLE 1

Lateral compressive strength and volume shrinkage after catalyst test

| | Catalyst before test | Catalyst from Example 1 | Catalyst from Comparative example 1 |
|---|---|---|---|
| Lateral compressive strength [N/tablet] | | 39.5 | 51.0 |

| | Catalyst after test | Catalyst from Example 1 | Catalyst from Comparative example 1 |
|---|---|---|---|
| Lateral compressive strength [N/tablet] | | 34.2 | 7.4 |
| Volume shrinkage [%] | | 12.5 | 22.4 |

COMPARATIVE EXAMPLE 2

The catalyst from Counter-example 1 is subjected to a repeated oxidation and reduction cycle before being installed in the test reactor. During the reduction, the hydrogen content is gradually increased to 3% by volume, and the oxygen content during the passivation is from 0.5 to 1.0% by volume. The cycle is carried out 5 times. After the end of the pretreatment, the catalyst has shrunk by about 20% by volume; the lateral compressive strength has decreased to a tenth of the original value. The abovementioned test is then carried out with this catalyst. The MeOH conversion achieved is about 10% below the value of the catalyst from Example 1. The catalyst removed after the end of the test has the properties summarized in Table 2:

TABLE 2

Lateral compressive strength and volume shrinkage after catalyst test

| | Catalyst before test (but after pretreatment) | Catalyst from Example 1 | Catalyst from Comparative example 2 |
|---|---|---|---|
| Lateral compressive strength [N/tablet] | | 39.5 | 3.5 |

| | Catalyst after test (but after pretreatment) | Catalyst from Example 1 | Catalyst from Comparative example 2 |
|---|---|---|---|
| Lateral compressive strength [N/tablet] | | 34.2 | 2.4 |
| Volume shrinkage [%] | | 12.5 | 1.5 |

The results show that, as a result of the chosen pretreatment, the volume shrinkage of the catalyst is reduced but at the same time the lateral compressive strength declines to such an extent that use in a mobile reformer is no longer possible. The catalyst pellet from Comparative example 2 can be crumbled with the hand without problems.

What is claimed is:

1. A methanol reforming catalyst containing passivated copper and zinc oxide and/or alumina, which can be prepared by
    (1) precipitating or spray-drying a mixture of catalyst precursor components dissolved or suspended in a diluent in order to form a solid catalyst precursor in the form of powder or granules,
    (2) calcining and reducing the solid catalyst precursor obtained in stage (1),
    (3) passivating the reduced catalyst precursor obtained in stage (2) and
    (4) shaping the passivated catalyst precursor obtained in stage (3) to form the catalyst,
and wherein stage (3) comprises passivating the reduced catalyst precursor obtained in stage (2) exclusively with dilute air at room temperature to obtain copper clusters which are only externally passivated.

2. A catalyst as claimed in claim 1, wherein the shaping in stage (4) leads to layers, extrudates, monoliths, strands, pellets, tablets or chips.

3. A catalyst as claimed in claim 1, wherein the calcination and reduction are carried out in succession in stage (2), it being possible for the calcined catalyst precursor to be comminuted in between.

4. A catalyst as claimed in claim 1, wherein the catalyst contains alumina in addition to passivated copper and zinc oxide, and solutions of zinc, aluminum and copper salts are precipitated simultaneously or in any desired sequence in stage (1).

5. A catalyst as claimed in claim 4, wherein stages (1) and (2) are carried out as follows:
    (a) precipitation of a solution of zinc and aluminum salts, the Zn:Al atomic ratio being from 3:1 to 1:3, with an alkali metal carbonate or hydroxide solution at a pH of from 5 to 12 and a temperature of from 20 to 100° C.,
    (b) isolation and washing of the precipitate to remove alkali metal ions,
    (c) drying of the precipitate,
    (d) calcination of the precipitate at from 250 to 800° C. to give a mixed oxide, (e) dispersing of the mixed oxide in an acidic solution of copper and zinc salts, the Cu:Zn atomic ratio in the solution being from 1:5 to 20:1, (f) precipitation of the dispersion with an alkali metal carbonate or hydroxide solution at a pH of from 6 to 9 and a temperature of from 20 to 100° C., (g) performance of steps (b) to (d), (h) reduction of the catalyst precursor obtained in stage (g) with a gas containing free hydrogen, it being possible for the solutions in steps (a) and/or (e) additionally to contain salts or oxides of one or more elements of the platinum metals, of groups 4, 5 and 11 and of the lanthanides of the Periodic Table of the Elements or for the salts or oxides to be applies to the mixed oxides.

6. A process for the preparation of the catalyst defined in claim 1, which comprises (1) precipitating or spray-drying a mixture of catalyst precursor components dissolved or suspended in a diluent in order to form a solid catalyst precursor in the form of powder or granules, (2) calcining and reducing the solid catalyst precursor obtained in stage (1), (3) passivating the reduced catalyst precursor obtained in stage (2) and (4) shaping the passivated catalyst precursor obtained in stage (3) to form the catalyst.

7. A process for reducing the volume shrinkage and for increasing the mechanical hardness during operation of methanol reforming catalysts, wherein the methanol reforming catalyst is prepared by a process as claimed in claim 6.

8. A process for steam-reforming methanol by reacting methanol and water over a catalyst, as defined in claim 1, at from 0.5 to 10 bar and from 150 to 450° C.

9. A catalyst as claimed in claim 1, wherein stage (2) comprises first calcining the solid catalyst precursor at a temperature of more than 300° C., and then subjecting the calcined solid catalyst precursor to a reduction or a calcination under reducing conditions at a temperature of less than 300° C.

10. A catalyst as claimed in claim 1, wherein stage (2) comprises reducing the solid catalyst precursor with hydrogen by means of an isothermal procedure at a constant hydrogen concentration;

an isothermal procedure with continuously increasing hydrogen concentrations;

a procedure employing a constant hydrogen concentration and a continuous increase in temperature from room temperature to 500° C.; or a procedure employing continuously increasing hydrogen concentrations and a continuous increase in temperature from room temperature to 500° C.

11. A catalyst as claimed in claim 1, wherein the reduced catalyst precursor is passivated in an assembly comprising two coupled rotating tubes and an inert lock ensuring a separation of atmospheres, and air is passed countercurrently to the reduced catalyst precursor into the rotating tube.

12. A catalyst as claimed in claim 1, wherein stage (2) comprises calcining and reducing the solid catalyst precursor simultaneously.

13. A catalyst as claimed in claim 1, wherein stage (2) comprises calcining and reducing the solid catalyst precursor in succession.

* * * * *